US012462783B2

(12) United States Patent
Fladmark et al.

(10) Patent No.: US 12,462,783 B2
(45) Date of Patent: Nov. 4, 2025

(54) ACTIVE NOISE CANCELLATION SYSTEM FOR A HELMET

(71) Applicant: DAAL Noise Control Systems AS, Trondheim (NO)

(72) Inventors: Bent Even Fossum Fladmark, Trondheim (NO); Ronny Fagervik Larsen, Trondheim (NO); Dag Axel Aarset Loe, Trondheim (NO); Sigmund Andreas Birkeland, Trondheim (NO)

(73) Assignee: BPONTHS AS, Oslo (NO)

( * ) Notice: Subject to any disclaimer, the term of this patent is extended or adjusted under 35 U.S.C. 154(b) by 359 days.

(21) Appl. No.: 17/290,765

(22) PCT Filed: Nov. 6, 2019

(86) PCT No.: PCT/EP2019/080430
§ 371 (c)(1),
(2) Date: May 2, 2021

(87) PCT Pub. No.: WO2020/094733
PCT Pub. Date: May 14, 2020

(65) Prior Publication Data

US 2022/0000206 A1 Jan. 6, 2022

(30) Foreign Application Priority Data

Nov. 6, 2018 (GB) ..................................... 1818094

(51) Int. Cl.
*G10K 11/178* (2006.01)
*H04R 1/10* (2006.01)

(52) U.S. Cl.
CPC ...... *G10K 11/178* (2013.01); *G10K 11/17881* (2018.01); *G10K 2210/3045* (2013.01); *G10K 2210/3219* (2013.01); *H04R 1/1083* (2013.01)

(58) Field of Classification Search
CPC .......... H04R 1/1083; A42B 3/00; A42B 3/166
See application file for complete search history.

(56) References Cited

U.S. PATENT DOCUMENTS

2016/0057538 A1 2/2016 Clark
2018/0025718 A1* 1/2018 Zukowski ........ G10K 11/17854 381/71.6

FOREIGN PATENT DOCUMENTS

EP 1 538 601 A2 6/2005
GB 2099680 A 12/1982
(Continued)

OTHER PUBLICATIONS

UK patent application No. 1815899.8, filed Sep. 27, 2019 (cited in specification).
(Continued)

*Primary Examiner* — Ping Lee
(74) *Attorney, Agent, or Firm* — Renner, Otto, Boisselle & Sklar, LLP

(57) ABSTRACT

An active noise cancellation (ANC) system has a mounting plate, a first face of which is configured to be disposed against an inner surface of a helmet to form, with the helmet, a chamber. When the mounting plate is mounted on the helmet, a loudspeaker provided on the first face of the mounting plate is within the chamber. The plate has an aperture for allowing transmission of sound from the loudspeaker to the spatial region. At least one reference microphone is mounted on a second face of the plate. The plate acts as a mounting plate for components of the ANC system, simplifying the process of installing an ANC system. Also, the plate serves to define a chamber that accommodates the loudspeaker of the ANC system and provides good acoustic coupling of the sound signal from the loudspeaker of the ANC system into the quiet zone of the ANC system.

22 Claims, 4 Drawing Sheets

(56) References Cited

FOREIGN PATENT DOCUMENTS

| | | | |
|---|---|---|---|
| JP | 2005-163222 | A | 6/2005 |
| WO | 2016/128459 | A1 | 8/2016 |

OTHER PUBLICATIONS

International Search Report for corresponding Application No. PCT/EP2019/080430, mailed Mar. 2, 2020.
Written Opinion for corresponding Application No. PCT/EP2019/080430, mailed Mar. 2, 2020.
Search Report for Corresponding UK App. No. GB1818094.3, dated Feb. 26, 2019.

* cited by examiner

ACTIVE NOISE CANCELLATION SYSTEM FOR A HELMET

TECHNICAL FIELD OF THE INVENTION

This application relates a helmet with a system for active noise cancellation, for use in situations where significant wind noise, or engine/exhaust noise, or other unwanted noise is likely to be present. Such a helmet may be used by, for example, a motorcyclist, bicycle rider, a person engaging in extreme or dynamic sports such as skydiving, alpine skiing, ski jumping, other motor sports etc. It also relates to an ANC system for use in a helmet

BACKGROUND OF THE INVENTION

It is in principle possible to reduce the effect of wind noise on the user of a helmet by providing the helmet with good passive sound insulating properties. However this adds weight and size to the helmet, and it is not normally practically possible to add enough sound insulating material to achieve satisfactory attenuation of wind noise. Also, providing passive sound insulation material has the potential disadvantage that useful sound information in the mid- to high frequencies (typically above 1 kHz-2 kHz, depending on the sound environment and user scenario) will be attenuated from the user. A motorcyclist, for example, would be unable, or less able, to hear the noise of nearby road vehicles or road users, and this could potentially be dangerous. In general, wind noise and important traffic sounds are in different frequency bands to one another. It is therefore preferable to preferentially attenuate sound in a frequency band that contains unwanted sounds such as wind noise, while providing little or no attenuation in a frequency band that contains potentially useful or important sound information, as this results in an improved environment for the user (by reducing the level of wind noise, or other unwanted noises) while still allowing the user to hear potentially useful or important sound information.

One method of achieving sound attenuation preferentially in one frequency band is active noise control. The basic physical methods of active noise control are known. In these methods a sound is attenuated through use of a noise-cancellation speaker that emits a sound wave with the same amplitude but with opposite phase (also known as "anti-phase", "antinoise" or "antisound") to the original sound. The original sound wave and the sound wave from the noise cancellation speaker destructively interfere with one another to effectively cancel each other out. An example of a helmet with active noise cancellation is described in EP 1 538 601.

In principle complete attenuation of the original sound wave in a desired frequency band may be achieved using active noise control, at least in a region of space. However complete attenuation requires the noise cancellation speaker to generate a sound wave that has exactly equal amplitude to the original sound wave in the desired frequency band, and that is exactly in antiphase to the original sound wave—and this may be difficult to achieve in practice, particularly in cases where the noise environment varies with time as is typically the case for wind noise generated by the helmet of a moving person, or in cases where the sound source(s) might vary with time with regard to their signal characteristics and/or location. An example of an active noise cancellation system is described in co-pending UK patent application No. 1815899.8, the contents of which are hereby incorporated by reference.

Helmets that are manufactured with a built-in active noise cancellation system are now available. However, it is desirable to make an ANC system more easily integrable into a helmet during the manufacture of the helmet, to simplify the manufacturing process and reduce costs. Further, where existing models of helmets are not currently manufactured with an ANC system, it would be desirable if an ANC system could be installed into such models without requiring changes to the design of the helmet. Also, some users would prefer to fit an active noise cancellation system to their existing helmet rather than having to purchase a new helmet, and it is preferable if this can be done without requiring any structural changes to the helmet.

A typical motorcycle helmet has a crushable layer, formed of a material that is designed to crush upon impact such as Expanded Polystyrene Foam (EPS). This is provided in an outer shell of a material such a plastics, fibre-glass or composites material, that provides support for the EPS layer and provides protection against penetration of the helmet. A padded fabric lining is typically provided on the inner surface of the EPS layer, to ensure user comfort. Nowadays many helmets are provided with a recess in the EPS layer on each side of the helmet at a position that will be close to the user's ear when the helmet is worn, to allow installation of a loudspeaker to provide a system that allows the user to communicate with other users and/or to allow the user to listen to music or traffic information broadcast by radio stations in the user's vicinity. It would be convenient if this recess could be used to accommodate components for an active noise cancellation system, as this would make it easier to re-fit a helmet with an ANC system. However, the requirements for acoustic coupling of the sound signal from a loudspeaker of an ANC system into the quiet zone of the ANC system are much more demanding than for coupling of the sound signals from a loudspeaker of a communication system. Further, to obtain good noise cancellation it is important to prevent, or at least keep to a low level, unwanted feedback from the loudspeaker of the ANC system to the reference microphone(s) of the ANC system.

SUMMARY OF THE INVENTION

A first aspect of the present invention provides an active noise cancellation (ANC) system for a helmet, for preferentially attenuating sound pressure in a first frequency range in a defined spatial region at a first side of the helmet, the ANC system comprising: a mounting plate, a first face of the mounting plate configured to be disposed, in use, against an inner surface of the helmet to form, with the helmet, a chamber; a loudspeaker provided on the first face of the mounting plate such that, when the mounting plate is mounted on the helmet, the loudspeaker is within the chamber, the plate comprising an aperture for allowing transmission of sound from the loudspeaker to the spatial region; at least one reference microphone mounted on a second face of the plate for measuring the sound pressure level; and a ANC control system for determining, based on output signals from the reference microphone(s), a drive signal for driving the loudspeaker to generate a sound signal that at least partially attenuates, in the defined spatial region and in the first frequency range, sound signals from at least one noise source. The plate acts as a mounting plate for components of the ANC system, and so simplifies the process of installing an ANC system to a helmet (whether the ANC system is installed at the time of manufacture of the helmet or later). Also, the plate serves to define a chamber that accommodates the loudspeaker of the ANC system and provides good acoustic coupling of the sound signal from the loudspeaker of the ANC system into the quiet zone of the ANC system and minimises unwanted feedback from the loudspeaker of the ANC system to the reference microphone(s) of the ANC system. Depending on the type of loudspeaker that is used, the aperture for allowing transmission of sound from the loudspeaker to the spatial region (the aperture 13 in FIG. 4(*a*) or 5(*a*) for example) may be the only aperture in the chamber, or there may be further apertures in addition to the aperture 13. For example there may be further apertures that pass from the chamber through the helmet and provide communication between the backside of the chamber (where the "backside" of the chamber is the side furthest from the plate) and the exterior of the helmet.

A second aspect of the present invention provides a helmet comprising an active noise cancellation (ANC) system for preferentially attenuating sound pressure in a first frequency range in a defined spatial region at a first side of the helmet, comprising: a loudspeaker disposed in a recess in an inner surface of the helmet; a mounting plate, a first side of the mounting plate disposed against an inner surface of the helmet, the plate disposed over the recess such that the plate and the inner layer form a chamber containing the loudspeaker, the plate having an aperture allowing transmission of sound from the loudspeaker to the defined spatial region; at least one reference microphone mounted on a second face of the plate for measuring the sound pressure level at a respective location on the first side of the helmet spaced from the defined spatial region; and a ANC control system for determining, based on output signals from the reference microphone(s), a drive signal for driving the loudspeaker to generate a sound signal that at least partially attenuates, in the defined spatial region and in the first frequency range, sound signals from at least one noise source.

The helmet or system may comprise an acoustic enclosure extending from the first face of the plate for receiving the loudspeaker.

The ANC control system may be configured to determine the drive signal based further on an output signal from a second microphone, the second microphone for measuring a signal indicative of the sound pressure level at the spatial region. As described with reference to FIG. 2 below, an ANC system may be a "static system", in which the parameters of the ANC system are constant over time, but in this aspect the ANC system may be "adaptive" in that the process of determining parameters of the ANC system is repeated at fixed or variable intervals based on a measurement of the actual sound pressure at the intended quiet zone by the second microphone.

The second microphone may be mounted on the plate. This again facilitates installation of the ANC system, as the second microphone may be pre-mounted on the plate along with other components. It may be mounted on the second surface of the plate.

The first face of the plate may be contoured so as to be generally complementary to the inner surface of the helmet.

The second face of the plate may be contoured so as to be generally complementary to the face of a person.

The helmet or system may comprise an acoustic enclosure surrounding the aperture for allowing transmission of sound from the loudspeaker and extending from the second face of the plate. This further improves the acoustic coupling of the sound signal from the loudspeaker of the ANC system into the quiet zone of the ANC system.

The ANC control system may be mounted on the plate. This again facilitates installation of the ANC system in the helmet, since the ANC control system may be pre-mounted on the plate along with other components.

The ANC control system may be disposed in a common package with the loudspeaker

The plate may be provided between the inner layer of the helmet and a lining layer.

The plate may comprise at least one second aperture, and the lining layer may be secured to the inner layer by a fastener passing through the second aperture. This avoids the need to provide one or more fasteners specifically for fastening the plate to the helmet, and so avoids the need to make modifications to the helmet and simplifies the plate.

A further aspect provides a mounting plate for mounting components of an active noise cancellation (ANC) system on a helmet, the ANC system for preferentially attenuating sound pressure in a first frequency range in a defined spatial region at a first side of the helmet. A first face of the mounting plate is configured to be disposed, in use, against an inner surface of the helmet to form, with the helmet, an acoustic chamber for receiving a loudspeaker of the ANC system. The plate comprises an aperture for allowing transmission of sound from the loudspeaker to the spatial region. The plate has mounting means for mounting at least one reference microphone on a second face of the plate for measuring the sound pressure level. As noted, the plate acts as a mounting plate for components of the ANC system, and so simplifies the process of installing an ANC system to a helmet (whether the ANC system is installed at the time of manufacture of the helmet or later). Also, the plate serves to define an acoustic chamber for the loudspeaker of the ANC system and provides good acoustic coupling of the sound signal from the loudspeaker of the ANC system into the quiet zone of the ANC system and minimises unwanted feedback from the loudspeaker of the ANC system to the reference microphone(s) of the ANC system.

A further aspect of the invention provides an ANC control system disposed in a common package with a loudspeaker of the ANC system.

BRIEF DESCRIPTION OF THE DRAWINGS

Preferred embodiments of the present invention will now be described with reference to the accompanying figures, in which:

FIG. 4(*b*) is a schematic perspective view from below of the plate of FIG. 4(*a*);

FIG. 4(*c*) is a side view of the plate of FIG. 4(*a*);

DETAILED DESCRIPTION OF THE INVENTION

Figure 1:
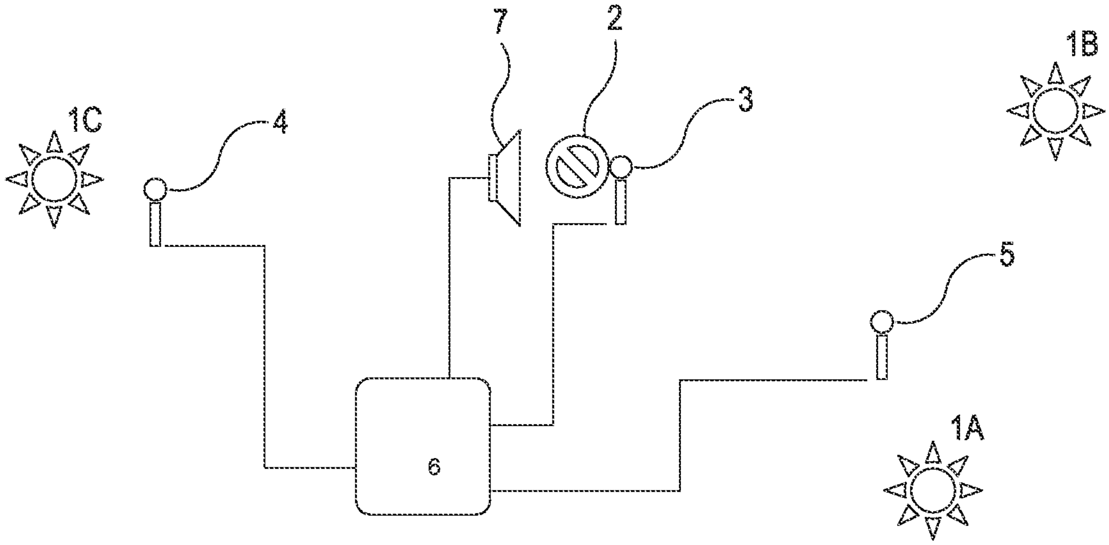
FIG. 1 is a system layout overview of an adaptive multichannel feed-forward ANC (active noise control) system.

FIG. 1 shows a general schematic layout of a feed-forward ANC system. The system has the following principal components:

a loudspeaker 7;

an error microphone 3 to measure the sound pressure level at a designated "quiet zone" 2, where the user's ear will be located;

one or more reference microphones 4, 5 to measure the instantaneous sound pressure level at respective locations away from the quiet zone, to provide information about sound waves travelling towards the desired quiet zone;

a control unit 6 for generating a drive signal for the loudspeaker;

power supply (typically a battery, not shown in FIG. 1).

In more detail, the sun-signs 1 (a, b and c) indicate examples of locations of sources of unwanted noise, such as wind noise, that it is desired to be attenuated. The goal is to minimize the sound pressure level at a region of space (or "quiet zone") indicated by the stop sign 2, in which the ear of the user will be located when the user is wearing the helmet. (FIG. 1 illustrates the layout to produce one quiet zone on one side of the helmet—a second ANC system will be required to provide a second quiet zone on the other side of the helmet for the user's other ear. The two ANC systems may be completely independent from one another, or one or more components (for example such as the control unit) may be common to both ANC systems.)

The overall functionality of the system of FIG. 1 is as follows:

1. The error microphone 3 measures the instantaneous sound pressure level at the location of the quiet zone and provides an output signal indicative of the measured sound pressure level at the location of the quiet zone.
2. Reference microphones 4, 5 each measure the instantaneous sound pressure level at respective locations away from the quiet zone and provide output signals indicative of the measured sound pressure levels at the locations of the reference microphones (known as "reference" signals). The signals are intended to provide information about sound waves travelling towards the desired quiet zone and that will result in sound pressure at the quiet zone at a future time that is determined by the distance of the reference microphone from the quiet zone and the speed of travel of the sound signal, and other properties of the transfer functions between the reference microphone locations and the quiet zone. (It should be noted however that the reference microphones can potentially measure all sound waves at their location, whether or not they are travelling towards the desired quiet zone—so there may be differences between the sound waves actually travelling to the quiet zone and the information about sound waves travelling towards the desired quiet zone obtained from the outputs from the reference microphones. The degree of directionality of the reference microphones and their orientation may affect how accurately the outputs from the reference microphones represent the sound waves actually travelling to the quiet zone.) The use of multiple reference microphones provides a multichannel feed-forward system, as distinct from a single channel feed-forward system, using only one reference microphone.
3. The control unit 6 determines signal filters, by using information from at least the signals from the reference microphones. These filters are applied to the signals from the reference microphones, to generate a drive signal for the loudspeaker 7. The drive signal is then sent to the loudspeaker 7. If the primary path between the noise source or noise sources and the quiet zone changes, or differs from the control units filter estimate or estimates, the corresponding control filter or filters might also change, indicating an adaptive system.
4. At the quiet zone 2, the sound output from the loudspeaker 7 interferes with the noise arriving from the sources 1 of unwanted sound thereby (if the output from the loudspeaker has been determined correctly) reducing the sound pressure level.

In general, the control unit determines the filters using some minimization criteria, for example reducing a parameter of the expected noise at the quiet zone to a minimum or reducing the parameter of expected noise at the quiet zone to be below a threshold value. For example there are known ANC systems that use a "least mean squared" algorithm that seeks to minimise the mean square value of the sound. In some cases the control unit determines the filters so as to preferentially attenuate sound in one frequency range (corresponding to unwanted sound) while not attenuating, or attenuating to a lesser degree, sound in another frequency band (corresponding to useful sound). In outline, information about sound signals that are expected to arrive at the quiet zone at a future time is known from the outputs of the reference microphones. This information can be used to calculate filters that generate a drive signal that causes the loud speaker to emit a sound signal that interferes with the arriving sound signals from the noise sources so as to attenuate the arriving sound signals from the noise source or sources (if the output from the loudspeaker has been determined correctly).

Figure 2:
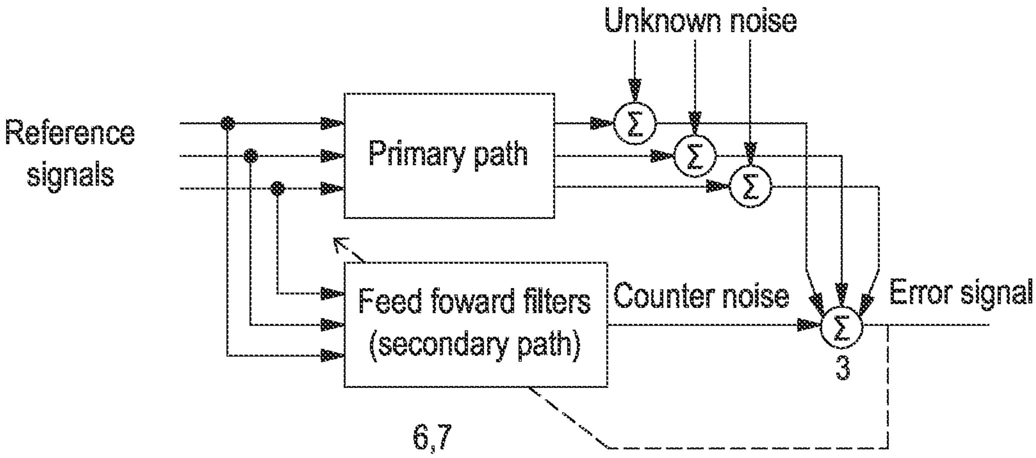
FIG. 2 is a block circuit diagram of a multichannel feed-forward system ANC system, illustrating the primary and secondary paths.

FIG. 2 is a block schematic diagram of an ANC system corresponding to FIG. 1. As shown, there are two sets of paths by which sound can reach the error microphone 3 (which is positioned close to the desired quiet zone and so is assumed to measure the sound pressure at the desired quiet zone), and these sets of paths are referred to as the "primary path" and the "secondary path".

The "primary path" is the set of acoustic paths (transfer functions) from the sound sources 1A, 1B, 10 (one transfer function for each source) of FIG. 1 to the quiet zone. As explained above, a source may be an actual part of the helmet which generates sound, or it may be a "virtual" source that is a point or region of the helmet from which the wearer of the helmet perceives sound to emanate, even though that sound is generated by a source external to the helmet. As also explained above, while it is intended that the information about the sound expected to reach the quiet zone at a particular time from the sources 1A, 1B, 10 is known from the reference signals output from the reference microphones at an earlier time, there is no guarantee that the information is correct. This is indicated in FIG. 2 by adding an "unknown noise" into each channel of the primary path. (A "channel" is a contribution to the sound reaching the quiet zone at a particular time from one of the sound sources 1A, 1B, 10 as determined from the reference signal output from the reference microphone associated with that sound source at an earlier time; FIG. 2 shows 3 channels, corresponding to three reference microphones—so corresponding to a system as shown in FIG. 1 but having three reference microphones rather than the two shown in FIG. 1.) This "unknown noise" can be considered as a prediction error, in that it represents the difference between the sound predicted to arrive at the quiet zone at a given time along a particular channel and the sound that actually arrives at that time along that channel. In general, the "unknown noise" in one channel may be different to the unknown noise in another channel.

The "secondary path" is the set of signal paths through the reference microphones, through the control unit 6, through the loudspeaker 7, and to the quiet zone and the error microphone 3. It is not necessary for the number of sources and reference microphones to be equal, since one microphone can be placed in such a way that it outputs the signal from more than one source (as indicated in FIG. 1). As explained above, the control unit 6 determines the drive signal for the loudspeaker at a particular time based on outputs of the reference microphones for earlier times. Mathematically, the control unit can be considered as determining the drive signal for the loudspeaker by applying a respective filter to the signal from each reference microphone. In this embodiment the control unit and loudspeaker form a "feed-forward" system in that sound signal generated by the loudspeaker is based on the output signals from the reference microphones.

The total sound at the quiet zone is the sum of the sound arriving via the primary path (which is the sound transferred acoustically from the known sources), and the sound arriving via the secondary path (through the reference microphones, the control unit and the loudspeaker 7), as well as the potential "unknown noise".

The actual sound pressure at the quiet zone is measured by the microphone 3 at/close to the quiet zone.

The control unit may be implemented in any convenient way. As one example it may be implemented using a microprocessor or other programmable-logic circuit and as another example it may be implemented as an analogue circuit.

The ANC system of FIG. 2 is a "static system", in which the filters are constant over time. This indicated by the absence of a signal path from the error signal back to the controller (as provided by the error microphone in FIG. 1). A static system may be used, either for reasons related to stability of the noise cancellation system, or if the primary path or paths do not change and/or satisfactory attenuation has been achieved. An ANC system can be designed to be static also if the layout contains an error microphone. Other ANC systems are "adaptive", as described below, and in an adaptive system the process of determining the filters is repeated at fixed or variable intervals based on a measurement of the actual sound pressure at the quiet zone (by the error microphone 3) as indicated by the broken line in FIG. 2.

In the system of FIG. 1 or FIG. 2 the or each reference microphone samples the sound pressure at a point between a sound source 1 and the quiet zone 2 at a given time. This gives access to a signal that is (hopefully strongly) correlated with the noise expected to arrive at the quiet zone at a future time. If the time difference between the time of sampling the sound pressure and the time at which the samples sound wave is expected to arrive at the quiet zone is greater than the time for a signal to pass through the ANC-system (from a microphone, through the control unit 6, to the speaker 7 and providing sound at the quiet zone), causality enables the system to produce an "anti-noise" that destructively interferes with the sound at the quiet zone, resulting in attenuation of the noise from the noise sources 1 and a reduction in the sound pressure level at the quiet zone. The width of the cross correlation function between reference signal and noise at the quiet zone can compensate somewhat for the lack of a sufficient time difference. Where possible it may be preferable for a reference microphone 4, 5 to be placed near to the sound source(s) that it is intended to monitor, as this increases the time difference of the signal from the reference microphone.

In the case of three noise sources shown in FIG. 1, the ideal drive signal d may be represented as:

$$d(t)=-F_1(t)\{n_1(t-\delta_1)\}-F_2\{n_2(t-\delta_2)\}-F_3\{n_3(t-\delta_3)\} \quad (1)$$

In equation 1, $n_i$ is the sound signal from the $i^{th}$ noise source, $\delta_i$ is the time advancement of the sound signal from the $i^{th}$ noise source, and $F_i(t)$ is the filter/transfer function for the sound signal from the $i^{th}$ noise source at time t.

Figure 3:
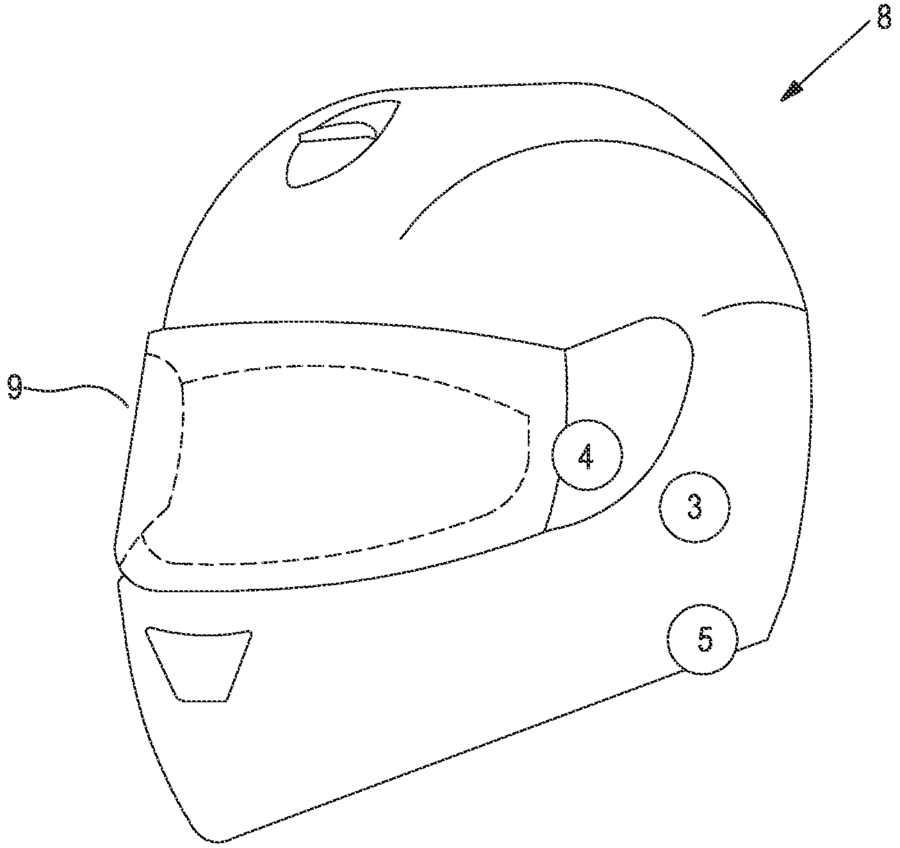
FIG. 3 is a side view of a helmet showing an arrangement of reference microphones according to one embodiment of an ANC helmet.

FIG. 3 shows examples of possible locations for reference microphones 4, 5 and the error microphone 3 on the left side of the helmet, i.e. for the wearer's left ear. The helmet can be provided with a second ANC system for generating a quiet zone on the right side of the helmet for the wearer's right ear. Generally the reference microphones and error microphone of the right side ANC will be arranged in corresponding locations to the reference microphones and error microphone of the left side ANC, but in principle the right side ANC system and the left side ANC system could be different from one another. The left side ANC system and the right side ANC system may share a common control unit and power supply, or they may each have a separate control unit and/or a common power supply.

As indicated in equation (1) the control unit generates a drive signal for a particular time for the loudspeaker based on the output from the reference microphone(s) at an earlier time, with the intention being that the drive signal will cause the loudspeaker to cancel the sound arriving in the intended quiet zone. The control unit generates the drive signal based on, inter alia, an expected location for the/each reference microphone relative to the quiet zone, which determines time taken for a sound signal measured by the reference microphone at a particular time to propagate to the quiet zone. It is therefore important that, when the components of the ANC system are installed in a helmet, they are installed at their correct locations relative to one another and relative to the location of the quiet zone/the user's ear—failure to do this will degrade the noise cancellation that is achieved. Again this is relatively straightforward to ensure when an ANC system is built into a helmet during its manufacture, but is more difficult to achieve when an ANC system is retrofitted to an existing helmet.

Figure 4A:
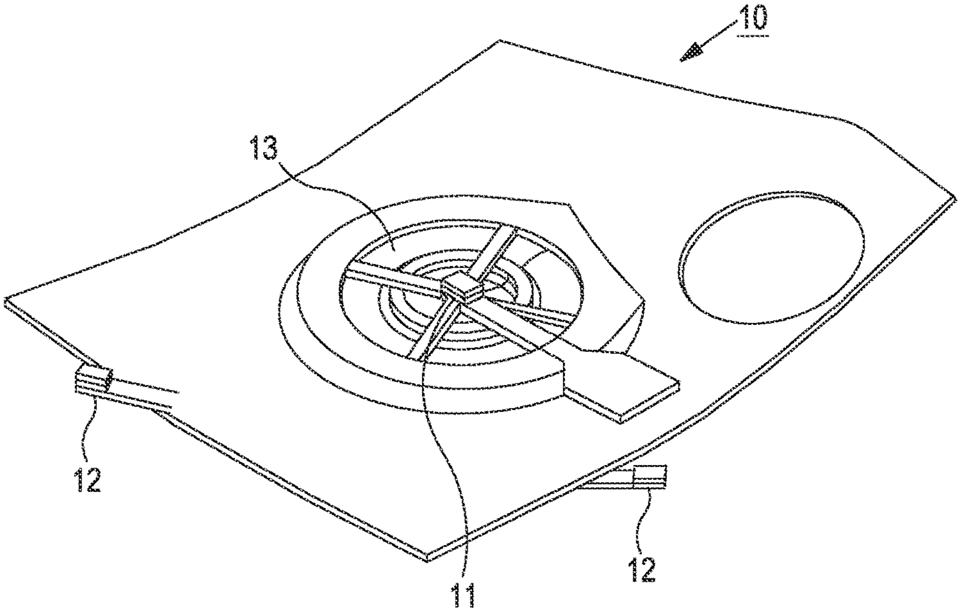
FIG. 4(*a*) is a schematic perspective view of a combined support and acoustic baffle plate for use in an ANC system of the present invention.
Figure 4B:
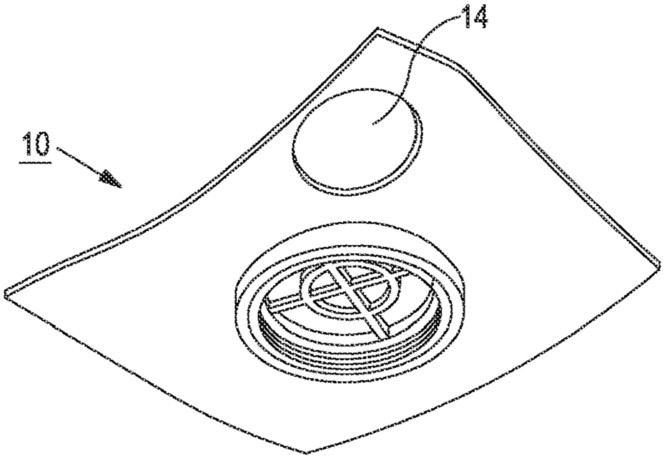
Figure 4C:
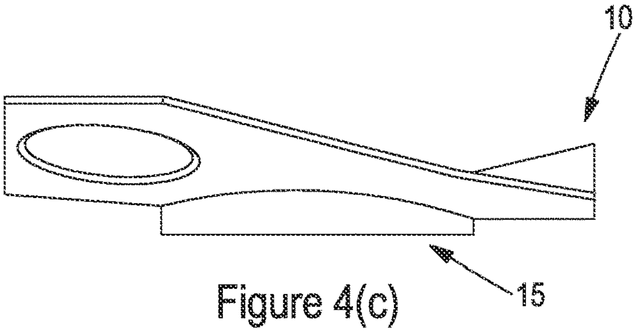

FIGS. 4(*a*)-4(*c*) illustrate a combined support and acoustic baffle plate 10 of the present invention. FIG. 4(*a*) is a schematic perspective view of the plate, FIG. 4(*b*) is a schematic perspective view of the plate from below, and FIG. 4(*c*) is a side view and an end view of the plate. The plate 10 may be used to retrofit an ANC system to an existing helmet, and to make use of an existing loudspeaker recess in the EPS layer of the helmet thereby avoiding the need to make any structural modifications to the helmet so that its structural integrity is not compromised. Further, the plate 10 is provide with mounting points or location points for the reference microphone(s) and optionally for other components of the ANC system, so that the correct position of the components relative to the quiet zone is ensured—when the reference microphone(s) are mounted to their respective mounting means on the plate 10 and the loudspeaker is mounted to the plate, the reference microphones and the loudspeaker will be at their correct locations relative to the quiet zone.

In use the plate 10 is mounted to the helmet such that the face that is hidden from view in FIG. 4(*a*) faces the EPS layer of the helmet, and the face that is visible in FIG. 4(*a*) faces the user's head. The face that is not visible in FIG. 4(*a*) is referred to as the "lower" face (referring to the orientation of the plate in FIG. 4(*a*)) or as the "inner" face (referring to the orientation of the plate when mounted on the helmet), and the face that is visible in FIG. 4(*a*) is referred to as the "upper" face (referring to the orientation of the plate in FIG. 4(*a*)) or as the "outer" face (referring to the orientation of the plate when mounted on the helmet).

In the embodiment of FIGS. 4(*a*)-4(*c*) the plate has a location/mounting point 11 for the error microphone and one or more location/mounting points 12 for the reference microphone(s) (two such location/mounting points 12 are shown in FIG. 4(*a*), but the invention is not limited to two location/mounting points 12). A microphone may be attached to its respective location/mounting point in any suitable way, for example it may be mechanically mounted using a suitable fastener and/or it may be mounted using an adhesive etc.

The plate 10 of FIGS. 4(*a*)-4(*c*) is also provided with an acoustic aperture 13 for allowing transmission of sound from the loudspeaker of the ANC system to the quiet zone. Preferably, as shown in FIG. 4(*b*), the plate is provided with a housing 15 extending from its inner face to house the loudspeaker. The housing 15 extends generally opposite to the acoustic aperture 13 to allow good transmission of sound from the loudspeaker to the quiet zone. is shown in FIG. 4(*b*). The external size of the housing 15 is slightly smaller than the size of the recess in the EPS layer of the helmet, and the internal size of the housing is made sufficiently large to accommodate the desired loudspeaker. FIG. 4(*b*) shows the housing with internal and external cross-sections that are circular, but the invention is in principle not limited to this.

In one embodiment, when fitting an ANC system to a helmet that has a recess in the EPS layer for receiving a loudspeaker, the loudspeaker of the ANC system is mounted on the plate 10, in the housing 15 if present, such that the acoustic aperture 13 is aligned with the loudspeaker. The plate is then mounted on the helmet such that the loudspeaker is disposed in the recess in the EPS layer. The loudspeaker is thereby disposed in a semi-enclosed chamber formed by the helmet (in particular by the crushable EPS layer of the helmet) and the plate 10. The plate 10 is secured to the helmet, for example as described below, thereby retaining the loudspeaker in position in the recess. This reduces the number of assembly steps required and so simplifies the installation process.

As noted, in addition to the aperture 13 there may be one or more through-holes that pass from the recess, through the EPS layer and the outer shell of the helmet, to the exterior of the helmet. Alternatively, for some types of loudspeakers, these through-holes are not necessary and the acoustic aperture 13 may be the only aperture in the chamber.

Retro-fitting an ANC system to an existing helmet is carried out in a similar way, except that any existing loudspeaker is first disconnected and removed from the loudspeaker recess in the EPS layer and, if necessary, the helmet's controller board is replaced as described in more detail below.

As shown in FIG. 4(*c*), to assist in forming a good acoustic chamber, the plate 10 is preferably shaped (eg contoured) so that the inner face, is complementary to the interior shape of the helmet. The outer face is also preferably contoured, to follow the expected shape of a user's head for comfort. Further, with the exception of the aperture 13, it is preferable that no other apertures are provided in any part of the plate that forms part of the acoustic chamber. This eliminates or reduces unwanted feedback from the loudspeaker of the ANC system to the reference microphone(s) of the ANC system As noted, a helmet is usually provided with a padded fabric lining, and this is typically secured to the EPS layer of the helmet by one or more clips or other releasable fastener, so that the lining can be removed for washing/repair or replacement. For example, the lining may be secured to the EPS layer using a snap fastener, with one part of the snap fastener attached to the lining and the other part attached to the EPS layer. In the embodiment of FIG. 4(*a*)-4(*c*) the plate 10 is provided with a fastening aperture 14 that allows the plate to be secured to the helmet using the clip/fastener for mounting the fabric lining to the helmet. In the case of snap fastener, as an example, the plate is positioned with the aperture 14 over the part of the snap fastener on the EPS layer, and the part of the snap fastener attached to the lining is fastened to the part of the snap fastener on the EPS layer to secure the lining to the EPS layer, and thereby secure the plate to the EPS layer. Only one fastening aperture 14 is shown in FIG. 4(*a*), but more than one fastening aperture may be provided. Provided that the fastening aperture(s) are provided away from the region(s) of the plate that form the acoustic chamber, they will have little or no effect on the noise cancellation achieved by the ANC system away. However, the invention is not limited to this particular method of securing the plate in position, and the plate may be mounted on the helmet in any suitable way.

The desire for the inner face of the plate to be contoured so as to be complementary to the interior shape of the helmet, for the acoustic aperture to align with the recess in the EPS layer for the loudspeaker, and for any mounting aperture(s) to coincide with the fastener(s) for the padded fabric lining means that a mounting plate will generally be specific to a particular model of helmet or to a group of related models of helmet models from the same manufacturer.

The plate 10 may be made from any suitable material such as a plastics material such as polypropylene, silicone or other suitable material. The plate thickness is typically between 1 mm and 2 mm. The plate typically is of the order of 10 cm in height and width, but these dimensions may be chosen to fit a particular model of helmet. As indicated in FIGS. 4(*a*) and 4(*b*) the plate need not have a regular shape, such as a rectangle—the shape may again be chosen to suit a particular model of helmet The plate may be formed by any suitable technique, such as thermal moulding or 3-D printing.

Figure 5A:
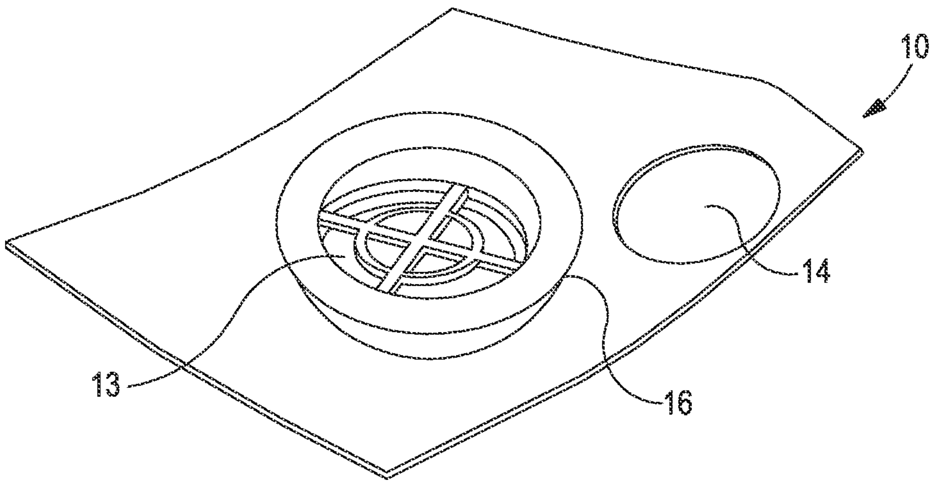
FIGS. 5(*a*) and 5(*b*) are a schematic perspective view and side view of another combined support and acoustic baffle plate for use in an ANC system of the present invention.
Figure 5B:
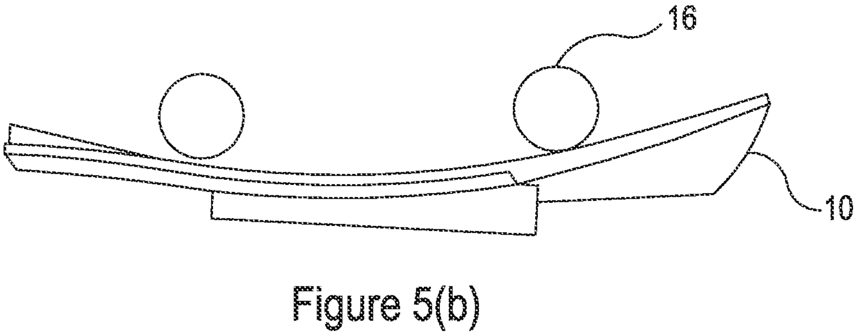

To provide effective noise cancellation it is desirable that there is a sound-tight, or partially sound-tight, chamber between the plate 10 and the user's ear. This may be provided by cushioning material 16 arranged in an annular or "doughnut" shape, so that it surrounds the acoustic aperture 13 and, when the user is wearing the helmet, contacts around the user's ear to provide a sound-tight, or partially sound tight, chamber from the aperture 13 to the user's ear. The cushioning material 16 forms an enclosure that surrounds the aperture 13 for allowing transmission of sound from the loudspeaker, and extends towards the ear of the user. This is shown in FIGS. 5(*a*) and 5(*b*). (In practice it is difficult to make the chamber completely sound-tight at least in a mass-produced helmet that has to accommodate variations in the user's head size, the possibility a user may wear glasses etc. However, some degree of sound leakage into the chamber can be tolerated without unduly worsening the sounds levels perceived by the user.)

Figure 6:
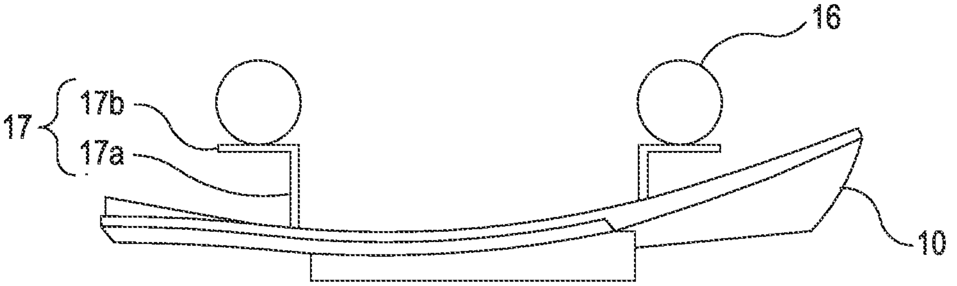
FIG. 6 is a schematic side view of another combined support and acoustic baffle plate for use in an ANC system of the present invention.

In a modified embodiment, the plate 10 may be provided with an upstand 17 on its front surface to which the cushioning material 16 may be mounted, as shown in FIG. 6. The upstand has a part 17*a* projecting from the upper surface of the plate 10, and a part 17*b* that extends generally perpendicular to the projecting part 17*a* to provide a surface on which the cushioning material may be mounted. The upstand 17 and the cushioning material 16 form an acoustic enclosure that surrounds the aperture 13 for allowing transmission of sound from the loudspeaker, and extends from the second face of the plate towards the ear of the user. This further improves the acoustic coupling of the sound signal from the loudspeaker of the ANC system into the quiet zone of the ANC system. The upstand 17 is preferably made of a soft/flexible plastic material, so that it will deform in the event of an accident involving the user and will not create a hazard for the user.

As explained above, the ANC system of FIG. 1 is provided with an error microphone for sensing the sound level in the quiet zone. Ideally, the error microphone would be provided in the ear cup of the ANC system, where it would be adjacent to the user's ear. Depending on the distance between the plate 10 and the desired position of the error microphone it may however be difficult to achieve this with an error microphone mounted on the plate 10, in which case the error microphone would have to be separately mounted within the ear cup. In a further aspect of the invention, however, the plate 10 may be provided with a location/mounting point 11 for the error microphone, so that the error microphone can be reliably and securely mounted. This also facilitates retro-fitting an ANC system to a helmet after its manufacture. In this aspect the error microphone is not mounted at its desired position in/at the quiet zone, but the position of the error microphone relative to the quiet zone will be known since the error microphone is mounted at a known position on the plate 10, which in turn is mounted at a known location on the helmet. The signal that would have been acquired by the error microphone had it been correctly located in the quiet zone may be estimated by applying a transfer function to the signal acquired by the error microphone at its actual location. Any suitable technique may be used for this, for example as described by Halim et al. in "Robust virtual acoustic sensing", Proceedings of ACOUSTICS 2005, the contents of which are hereby incorporated by reference, available at https://www.researchgate.net/publication/235898249.

The process of compensating for the error microphone not being at its desired position in the quiet zone may also be thought of as replacing the filters $F_i$ (t) in equation (1) above by adjusted filters $F'_i$ (t), so that the loudspeaker generates an adjusted sound signal to compensate for the different position of the error microphone.

Indeed, in one implementation the ANC system may include only one microphone, that functions as both a reference microphone and an error microphone. The signal from the microphone is used to provide information about sound waves travelling towards the desired quiet zone as described above, and is also used to estimate the signal that would have been acquired by the error microphone had it been correctly located in the quiet zone (by applying a transfer function as described above).

As will be understood therefore, not only is the physical configuration of a mounting plate likely to be specific to a particular model of helmet or to a group of related helmet models from the same manufacturer, but the parameters of the ANC system will also in general be specific to a particular model of helmet or to a group of related helmet models, since the filters that the ANC system need apply will be dependent on the physical arrangement of the components of the ANC system (ie the relative locations and separations of the reference microphone(s), the loudspeaker, the quiet zone, and the error microphone (if provided).

In a further aspect of the invention, the loudspeaker of the ANC system and the control electronics of the ANC system are provided in a single package, that is sized and shaped so as to fit into the recess for a loudspeaker provided in the EPS layer of the helmet that is being retro-fitted with an ANC system (and in the loudspeaker housing 15 where provided). It has been found possible to provide a suitable loudspeaker and the ANC control unit in a package having a diameter of approximately 40 mm and a height of approximately 12 mm. The control electronics may be implemented in hardware, in software, or in a combination of hardware and software.

In addition to the ANC control electronics, the helmet is generally provided with a control system for controlling the overall operation of the ANC system. For convenience, components of the control system are preferably mounted on a component, referred to herein as a "controller board". This again may be implemented in hardware, in software, or in a combination of hardware and software. The controller board communicates with a power supply, for example a battery (that may be mounted on the controller board or may be provided elsewhere) and supplies power to the ANC system, to operate the ANC control electronics and drive the loudspeaker. The controller board preferably also can provide an output to the combined loudspeaker/ANC control electronics package that controls the loudspeaker to operate in a non-ANC use, for example communication or music streaming, either together with the operation of the ANC system or instead of operation of the ANC system. Additionally or alternatively the controller board preferably also can receive a signal from the combined loudspeaker/ANC control electronics package that provides information on the status of the ANC system and/or performance statistics of the ANC system. Additionally or alternatively the controller board preferably also has a charging input for, where the power supply is a rechargeable battery, connection to a power supply to allow the battery to be recharged. As noted, a helmet will usually be fitted with an ANC system for the user's left ear and an ANC system for the user's right ear—the left and right ANC systems may have separate controller boards, or there may be a single controller board for both the left ear ANC system and the right ear ANC system.

The controller board(s) and the battery(ies) may be mounted at any suitable locations on the helmet.

Particularly preferably the combined loudspeaker/ANC control electronics package is provided with the appropriate electrical connectors to allow the package to be directly connected to the existing electrical connectors in in the helmet. Where a helmet is already provided with a controller board that is compatible with the ANC system, the helmet may be provided with an ANC system by unplugging any existing loudspeaker and plugging the ANC loudspeaker/ANC control electronics package to the existing connectors, and mounting the ANC loudspeaker/ANC control electronics package to the plate 10. The baffle/component support plate 10 is then mounted on the helmet as described above and is fastened to the helmet for example using the fastener(s) for the padded fabric lining of the helmet as described above. The error microphone and the reference microphone(s) are then mounted on the location/mounting points 11, 12 on the plate 10 to complete installation of the ANC system.

These may be pre-connected (eg, hard-wired) to the ANC loudspeaker/ANC control package.

Where a helmet is not already provided with a controller board that is compatible with the ANC system, in addition to the above steps it is necessary to install a suitable controller board (after removing the existing controller board, if one is provided).

Typically, the combined loudspeaker/ANC control circuitry package will require connections for the following:

- power supply (typically 3-5V);
- ANC enable/disable input to allow a user to turn the ANC system ON/OFF;
- at least one other input/output (either digital or analogue), for example to allow one or more of:
  - provision of an non-ANC drive signal to the loudspeaker (eg for Bluetooth, mobile telephone or other communication, music/audio, etc);
  - calibration of the ANC system;
  - change the ANC filter setting (for example to change the focus of which frequencies the filter will attenuate by implementing a frequency weighting curve in the filter);
  - delivery of system updates;
  - provision of an output showing the status of the ANC system;
  - provision of output showing performance statistics of the ANC system.

The invention claimed is:

1. An active noise cancellation (ANC) system for a helmet, for attenuating sound pressure in a first frequency range in a defined spatial region at a first side of the helmet, the ANC system comprising:

- a plate, a first face of the plate configured to be disposed, in use, against an inner surface of the helmet to form, with the helmet, a chamber, such that the plate forms a first wall of the chamber and the inner surface of the helmet forms a second wall of the chamber;
- a loudspeaker provided on the first face of the plate such that, when the plate is mounted on the helmet, the loudspeaker is within the chamber, the plate comprising an aperture for allowing transmission of sound from the loudspeaker to the spatial region;
- at least one microphone for measuring the sound pressure; and
- an ANC control system for determining, based on output signals from the at least one microphone, a drive signal for driving the loudspeaker to generate a sound signal that at least partially attenuates, in the defined spatial region and in the first frequency range, sound signals from at least one noise source.

2. The ANC system as claimed in claim 1 and comprising an acoustic enclosure extending from the first face of the plate for receiving the loudspeaker.

3. The ANC system as claimed in claim 1 wherein the at least one microphone includes two or more microphones and the ANC control system is configured to determine the drive signal based on an output signal from the two or more microphones, the two or more microphones for measuring a signal indicative of the sound pressure at the spatial region.

4. The ANC system as claimed in claim 3 wherein at least one of the two or more microphones are mounted on the plate.

5. The ANC system as claimed in claim 4 wherein at least one of the two or more microphones are is mounted on at least one of the first face and a second face of the plate.

6. The ANC system as claimed in claim 1 wherein the first face of the plate is contoured so as to be generally complementary to the inner surface of the helmet.

7. The ANC system as claimed in claim 1 wherein the second face of the plate is contoured so as to be generally complementary to the face of a person.

8. The ANC system as claimed in claim 1 and comprising an acoustic enclosure surrounding the aperture for allowing transmission of sound from the loudspeaker and extending from the second face of the plate.

9. The ANC system as claimed in claim 1 wherein the ANC control system is mounted on the plate.

10. The ANC system as claimed in claim 1 wherein the ANC system is completely or partially disposed in a common package with the loudspeaker.

11. A helmet comprising an active noise cancellation (ANC) system for attenuating sound pressure in a first frequency range in a defined spatial region at a first side of the helmet, comprising:

- a loudspeaker disposed in a recess in an inner layer of the helmet;
- a plate, a first face of the plate disposed against the inner surface of the helmet, the plate disposed over the recess such that the plate and the inner layer form a chamber containing the loudspeaker, such that the plate forms a first wall of the chamber and the inner layer of the helmet forms a second wall of the chamber, the plate having an aperture allowing transmission of sound from the loudspeaker to the defined spatial region;
- at least one microphone for measuring the sound pressure; and
- an ANC control system for determining, based on output signals from the at least one microphone, a drive signal for driving the loudspeaker to generate a sound signal that at least partially attenuates, in the defined spatial region and in the first frequency range, sound signals from at least one noise source.

12. The helmet as claimed in claim 11 and comprising an acoustic enclosure extending from the first face of the plate for receiving the loudspeaker.

13. The helmet as claimed in claim 11 wherein the at least one microphone includes two or more microphones and the ANC control system is configured to determine the drive signal based on an output signal from the two or more microphones, the two or more microphones for measuring a signal indicative of the sound pressure at the spatial region.

14. The helmet as claimed in claim 13 wherein at least one of the two or more microphones are mounted on the plate.

15. The helmet as claimed in claim 14 wherein at least one of the two or more microphones are mounted on at least one of the first face and a second face of the plate.

16. The helmet as claimed in claim 11 wherein the first face of the plate is contoured so as to be generally complementary to the inner surface of the helmet.

17. The helmet as claimed in claim 11 wherein the second face of the plate is contoured so as to be generally complementary to the face of a person.

18. The helmet as claimed in claim 11 and comprising an acoustic enclosure surrounding the aperture for allowing transmission of sound from the loudspeaker and extending from the second face of the plate.

19. The helmet as claimed in claim 11 wherein the ANC control system is mounted on the plate.

20. The helmet as claimed in claim 11 wherein the ANC system is completely or partially disposed in a common package with the loudspeaker.

21. The helmet as claimed in claim 11 wherein the plate is provided between the inner layer of the helmet and a lining layer.

22. The helmet as claimed in claim 21 wherein the plate comprises at least one second aperture, and the lining layer is secured to the inner layer by a fastener passing through the second aperture.

* * * * *